(12) United States Patent
Stocker et al.

(10) Patent No.: US 8,819,373 B2
(45) Date of Patent: Aug. 26, 2014

(54) MANAGING PERSISTENT AND TEMPORARY DATA OBJECTS IN A PORTABLE DATA CARRIER

(75) Inventors: Thomas Stocker, München (DE); Georg Kramphosthuber, München (DE)

(73) Assignee: Giesecke & Devrient GmbH, Munich (DE)

( * ) Notice: Subject to any disclaimer, the term of this patent is extended or adjusted under 35 U.S.C. 154(b) by 62 days.

(21) Appl. No.: 10/555,704

(22) PCT Filed: May 4, 2004

(86) PCT No.: PCT/EP2004/004723
§ 371 (c)(1),
(2), (4) Date: Nov. 3, 2005

(87) PCT Pub. No.: WO2004/100090
PCT Pub. Date: Nov. 18, 2004

(65) Prior Publication Data
US 2007/0016744 A1  Jan. 18, 2007

(30) Foreign Application Priority Data
May 6, 2003 (DE) .................. 103 20 062

(51) Int. Cl.
G06F 12/00 (2006.01)
G06F 13/00 (2006.01)
G06F 13/28 (2006.01)

(52) U.S. Cl.
USPC ........................................ 711/165

(58) Field of Classification Search
None
See application file for complete search history.

(56) References Cited

U.S. PATENT DOCUMENTS 4,829,169 A    5/1989   Watanabe

FOREIGN PATENT DOCUMENTS

| CN | 1234568 | 11/1999 |
| EP | 0 955 577 | 11/1999 |
| EP | 0 964 370 | 12/1999 |
| EP | 1 006 478 | 6/2000 |

OTHER PUBLICATIONS

Oestreicher et al., Object Lifetimes in Java Card, 1999,USENIX Association,10 pages.*

(Continued)

*Primary Examiner* — April Y Blair
*Assistant Examiner* — Gary W Cygiel
(74) *Attorney, Agent, or Firm* — Martine Penilla Group LLP

(57) ABSTRACT

In a process for memory management in the execution of a program by a portable data carrier which has a first and a second memory region for the storage of objects generated in program execution, an object is initially created at least in part in the second memory region. If, in the course of further program execution, a persistent reference to the object is generated, the object is transferred to the first memory region. In a process for converting a source program into an executable program, a check is carried out at compile time as to whether a persistent reference to an object to be newly created is generated. Depending on the result of that check, program code is generated which creates the object either in the first or at least in part in the second memory region.

31 Claims, 3 Drawing Sheets

(56) References Cited

OTHER PUBLICATIONS

Cramer et al., Compiling Java Just in Time, 1997, IEEE, 8 pages.*
Rankl et al., Smart Card Handbook, 2003, Wiley, 3rd edition, 3 pages.*
Leroy, On-Card Bytecode Verification for Java Card, 2001, Springer-Verlag Berlin Heidelberg, 15 pages.*
Wilson, Paul R., Uniprocessor Garbage Collection Techniques, 1992, 67 pages.*
Abstract of Chinese Patent Publication No. 1234568 dated Nov. 10, 1999 (retrieved from State Intellectual Property Office of the P.R. China website).
Sun Microsystems, Inc., "Java Card™ 2.2 Runtime Environment (JCRE) Specification," Jun. 2002, pp. 25-27, Palo Alto, California.
Sun Microsystems, Inc., "Java Card™ 2.2 Application Programming Interface," Jun. 2002, pp. 81-85, Palo Alto, California.

* cited by examiner

MANAGING PERSISTENT AND TEMPORARY DATA OBJECTS IN A PORTABLE DATA CARRIER

BACKGROUND OF THE INVENTION

1. Field of the Invention

The invention relates in general to the technical field of memory management in the execution of a program by a portable data carrier having a processor. A portable data carrier of such a kind can be especially a chip card in various constructional forms or a chip module. The invention relates more particularly to the use of two different memory regions of the data carrier in order to store objects generated during program execution.

2. Description of Related Art

In portable data carriers there are generally provided a plurality of memory regions which are constructed in various memory technologies. Typically, the memory is subdivided into a volatile read/write memory (RAM), a non-volatile writable memory (EEPROM) and a mask-programmed fixed value memory (ROM). A write-to-RAM operation requires substantially less time—for example, less by a factor of 30—than a write-to-EEPROM operation. On the other hand, one bit in RAM takes up a substantially greater area on a semiconductor chip of the data carrier than one bit in EEPROM so that usually only relatively little RAM is provided. The problem accordingly exists of utilizing the fast but scarce RAM in the best and most flexible manner possible.

Portable data carriers with complex memory management functions are known, for example, under the trademark Java Card™. The document "Java Card™ 2.2 Runtime Environment (JCRE) Specification", June 2002, published by the company Sun Microsystems, Inc., Palo Alto, USA, available on the Internet under http://java.sun.com/products/javacard, describes the environment provided in a Java Card for the execution of programs (Java Card Applets). Chapter 5 describes that persistent objects are typically stored in the EEPROM of the data carrier whereas transient objects are typically created in the RAM. For reasons of security, it is not allowed to store transient objects in the EEPROM.

In the memory management of a Java Card just described, special system calls are used for generating transient objects, as described, for example, on pages 81-85 of the document "Java Card™ 2.2 Application Programming Interface", June 2002, published by the company Sun Microsystems, Inc., Palo Alto, USA, available on the Internet under the above-mentioned address. This limits the extent to which transient objects are utilized in practice. In addition thereto, transient objects as such have a potentially unlimited life; the term "transient" refers merely to the data stored in the objects. Using transient objects therefore brings about only a slight increase in flexibility in memory management.

The customary and recommended practice in programming a Java Card is that all objects required during the entire life of a program (Applet) are statically created on installation of the program. This is carried out in a method having the prespecified name "install". The said practice results, however, in memory management which is of low flexibility and, therefore, not optimal. When, for example, a transient field is created in a program in order to store temporary data for cryptographic operations, the memory space statically reserved therefor in the RAM is generally unavailable to other programs. Within the program, the extent to which such reserved memory space is also used for other tasks depends on the expertise of the programmer. It would therefore be desirable to improve utilization of the scarce memory space in the RAM and to automate memory management.

SUMMARY OF THE INVENTION

An object of the invention is accordingly to avoid, at least in part, the problems of the prior art. A further object of the invention is to make available a technique for memory management in a portable data carrier by means of which technique the utilization of an efficiently writable memory region—typically a RAM memory—is improved. Yet a further object of some embodiments is to make possible flexible utilization of the RAM memory without involving much work for the programmer.

In accordance with the invention, the above problems are solved, in whole or in part, by a process for memory management in the execution of a program by a portable data carrier which has a first and a second memory region for storage of objects generated in program execution, wherein write operations to the second memory region are performed more efficiently than write operations to the first memory region, the process comprising creation of an object generated in program execution, at least in part in the second memory region, and transfer of the object to the first memory region if, in the course of further program execution, a persistent reference to the object is generated.

Further in accordance with the invention, the above problems are solved, in whole or in part, by a process for converting a source program into a program intended for execution by a portable data carrier, wherein the data carrier has a first and a second memory region for storage of objects generated in program execution and wherein write operations to the second memory region are performed more efficiently than write operations to the first memory region, wherein, on conversion of a portion of the source program which contains the generation of an object, it is checked at least approximately whether a persistent reference to the object is generated in the converted portion of the source program; and, depending on the result of that check, either program code is generated which creates the object in the first memory region or program code is generated which creates the object at least in part in the second memory region.

Further in accordance with the invention, the above problems are solved, in whole or in part, by a portable data carrier and/or a computer program product that are adapted for carrying out the above processes.

The basic idea underlying the invention is that certain objects which are generated in the execution of the program by the portable data carrier are automatically created in an efficiently writable memory region—for example, in the RAM. For that purpose there come into consideration, in particular, those objects which have only a short life. Objects of such a kind are referred to in the present document as "local objects". Local objects as understood by the invention can be, for example, exception objects, as are generated when exceptions occur. The life of an exception object ends as soon as the exception in question has been caught.

By means of the invention, temporarily required memory space can be made available for a short period and dynamically—namely in the form of a local object. The local object is created, in part or in whole, in the RAM or another efficiently writable memory. As a result of the automatic and dynamic memory management of the invention, that memory is utilized especially well, which increases the efficiency of the data carrier both in respect of processing speed and also in respect of the memory space effectively available for the programs executed.

In general, the life of an object is at an end when no more references to the object exist, because access to the object is then no longer possible. In particular, a local object can be defined by the fact that no persistent reference to the object exists. A "persistent reference" is to be understood herein as a reference to the object, which reference is persistently stored, for example, in a field of an object, a static field or a field of an array. As soon as a reference to an object is written into one of the mentioned fields, the object can no longer be a local object. In contrast, non-persistent references to an object, which are contained, for example, in the operand stack or in a local variable, do not influence classification of an object as a local or non-local object.

The distinction as to whether an object is to be treated as a local or non-local object can be made at program compile time or at run time or partly at compile time and partly at run time. In the case of a distinction being made at run time, at least some newly generated objects are created, initially, in the second, efficiently writable memory region. During further program execution, monitoring is performed as to whether a persistent reference to the object is created. As soon as that is the case, the object can no longer be treated as a local object. It is then transferred into the first, non-volatile memory region.

In the case of a distinction being made at compile time, the compiler analyses that portion of the source program which contains the object generation as to whether a persistent reference to the object is created. Depending on the result of the analysis, the compiler then generates program code which creates the object in the first or—in whole or in part—in the second memory region. The term "compiler" is intended in the terminology of the present document to include all programs which execute automatic conversion procedures. Accordingly, besides the Java compiler in the narrower sense, "compilers" are intended also to refer to, for example, converters for the generation of CAP files (Card Application Files) and optimization programs.

A source program analysis at compile time is generally capable of supplying an only approximate result, which is understood to mean that, at least, a certain degree of uncertainty is associated with one of the two classifications of an object as local or non-local. Provision can therefore be made so that only objects which are recognized with certainty as being local are created in the second memory region whereas all other objects are created in the first memory region. In contrast, in an alternative embodiment, only objects which are recognized with certainty as being non-local are created in the first memory region whereas all other objects are created in the second memory region. Then, in addition, at least for objects which it was not possible to classify with certainty as local, the above-described run time monitoring is carried out. In some forms of embodiment, compiler directives (pragmas) are provided by means of which objects can be characterized as local or non-local.

In preferred embodiments, simple criteria are applied—at run time or compile time, as desired—in order to determine whether objects are to be created in the first or, initially, in the second memory region. For example, provision can be made so that objects generated by the install method of the program are created in the first memory region. In different forms of embodiment, either all other objects can be created, initially, in the second memory region, or merely individual kinds of objects. Such kinds of objects can be, for example, exception objects or objects which are required only temporarily for cryptographic operations.

The life of a local object is usually at an end with the termination—either resulting from a return or from an exception—of the method in which the local object was generated, because at that moment the possibly existing local references to the object are erased. The memory space that may still be required for the object in the second memory region can then be freed up. An exception to the rule that has just been mentioned applies when the object is used as a return parameter of the method which has generated the object. In that case, the calling method receives a reference to the object so that the object must not be erased at least until termination of that method.

In order to be able to utilise freed-up memory space in the second memory region for the creation of new objects, memory clean-up (garbage collection) is provided in some forms of embodiment. However, this is time-consuming during program execution and increases the complexity of the run time environment. Preferably, therefore, an especially simple process is used wherein a fill-level indicator shows the occupation of the second memory region. On termination of a method, the fill-level indicator is usually reset to the state it was in when that method was called. An exception to that rule is made in preferred embodiments only when that portion of the second memory region which is freed up by the resetting contains an object which is used as a return parameter of the method.

In order to ensure that, if so required, an object can be transferred from the second to the first memory region, it is checked, preferably already when the object is created in the second memory region, whether sufficient space for the object is also available in the first memory region. It is also preferably ensured during further program execution, when new objects are created, that there is always sufficient space in the first memory region for a potentially necessary transfer of objects.

In preferred embodiments, the first memory region is located in an EEPROM or another non-volatile writable memory of the data carrier whereas the second memory region is arranged in a RAM or another efficiently writable memory. The second memory region can especially be in the form of a local heap and/or in a stack memory. Storage in a stack memory is advantageous especially for objects already identified as local objects at compile time.

The computer program product according to the invention comprises program commands in order to implement the conversion process according to the invention. A computer program product of such a kind can be a physical medium, for example a semiconductor memory or a diskette or a CD-ROM, on which a program is stored for carrying out a process according to the invention. The computer program product is preferably a compiler intended for execution by a customary workstation computer in order to generate programs for portable data carriers.

In preferred embodiments, the data carrier and/or the computer program product has/have features which correspond to the features that are described above and/or that are mentioned in the dependent process claims.

BRIEF DESCRIPTION OF THE DRAWINGS

Further features, advantages and functions of the invention will emerge from the following specific description of an exemplifying embodiment and a number of alternative embodiments. Reference is made to the diagrammatic drawings, in which.

DETAILED DESCRIPTION OF EXEMPLARY EMBODIMENTS

Figure 1:
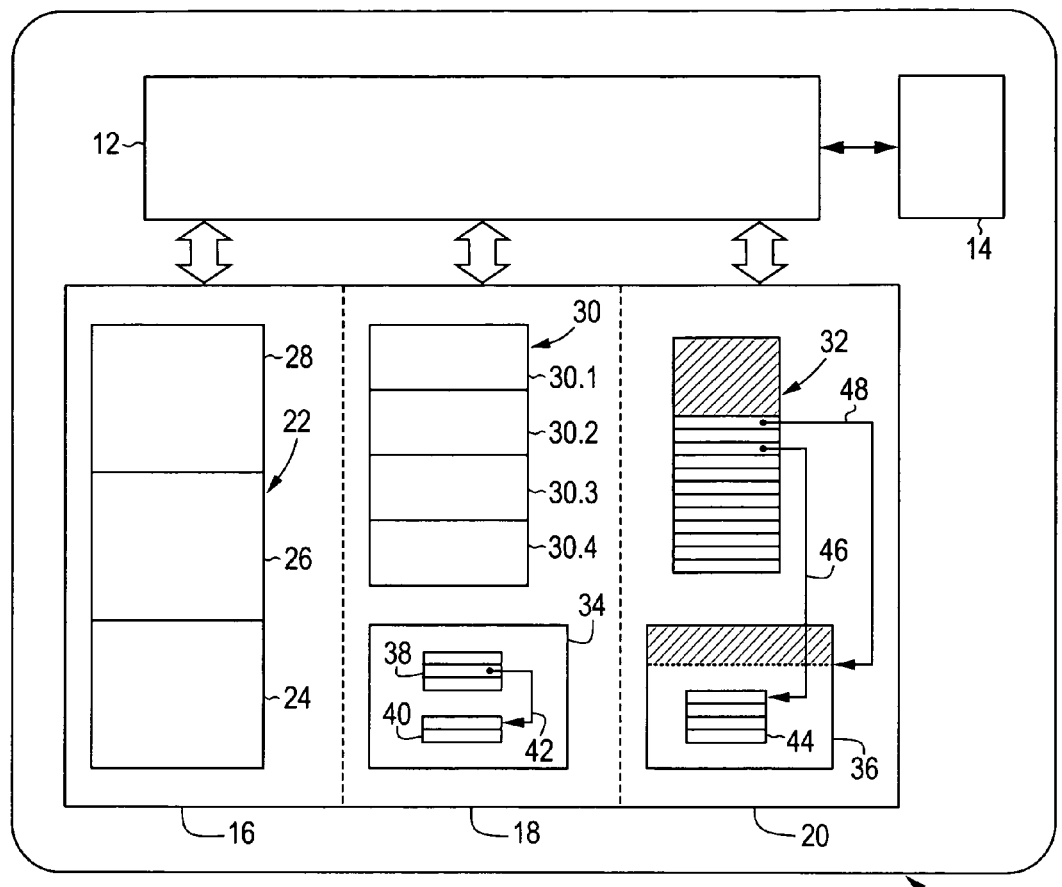
FIG. 1 is a block diagram of a portable data carrier in accordance with an exemplifying embodiment of the invention.

The data carrier 10 shown in FIG. 1 is, in the present exemplifying embodiment, in the form of a chip card in accordance with the Java Card standard. The data carrier 10 has, on a single semiconductor chip, a processor 12, a plurality of memory zones constructed in various technologies, and an interface circuit 14 for contactless or contact-bound communication. In the present exemplifying embodiment, a fixed value memory 16, a non-volatile writable memory 18 and a write/read memory 20 are provided as memory zones. The fixed value memory 16 is in the form of mask-programmed ROM, the non-volatile memory 18 is in the form of electrically erasable and programmable EEPROM and the write/read memory 20 is in the form of RAM. Write operations to the non-volatile memory 18 are relatively onerous and require, for example, thirty times as much time as write operations to the write/read memory 20.

System programs 22, which are required for operation of the data carrier 10, are contained in the fixed value memory 16—and also, in part, in the non-volatile memory 18. In a manner known per se, the system programs 22 include an operating system 24 and also program code 26 for implementing a virtual machine 26, which in the present exemplifying embodiment is in the form of a JCVM (Java Card Virtual Machine). Also provided is a class library 28, which makes available application programming interfaces. A program 30, which is in the form of a Java Card Applet, has been loaded into the non-volatile memory 18 on initialization of the data carrier 10; in alternative embodiments, the program 30 can be located, in whole or in part, in the fixed value memory 16. Although only a single program 30 is shown in FIG. 1, further programs can be provided for execution by the processor 12 of the portable data carrier 10. The program 30 comprises a plurality of methods 30.1, 30.2, 30.3, 30.4, which hereinbelow are referred to collectively as 30.x. In a manner known per se, the methods 30.x include a method, referred to as the "install" method, for installation of the program 30, a method, referred to as the "process" method, for processing incoming data packages, and optionally "select" and "deselect" methods, which are called when changing between a plurality of programs of the data carrier 10.

A stack memory 32 located in the write/read memory 20 takes up operands, return addresses, local variables and other data values during program execution. The free region of the stack memory 32 is illustrated in FIG. 1 by hatching.

In the non-volatile memory 18 there is reserved a first memory region 34 which, in a manner known per se, is in the form of a persistent heap. In accordance with the customary Java Card architecture, all objects, static data fields and non-transient arrays would be created in this persistent heap. In contrast, in the present exemplifying embodiment, the persistent heap is used only selectively. Local objects which are expected to have only a short life and to which no persistent references refer are created not in the first memory region 34 but rather in a second memory region 36 in the write/read memory 20. The second memory region 36 is also referred to as a local heap because it, similarly to the persistent heap, serves for the storage of objects.

In order to illustrate the situation just described, FIG. 1 shows, by way of example, two objects 38, 40 created in the first memory region 34, each of which comprises a plurality of data fields. One of the data fields of the first object 38 contains a reference 42 to the second object 40. The reference 42 is also referred to as a "persistent reference" because it is contained in a persistently stored data field. The second object 40 is not a local object but rather a persistent object because the persistent reference 42 refers to it. In the second memory region 36 there is shown, by way of example, a local object 44. A local reference 46, which is, for example, contained in a local variable created in the stack memory 32, refers to the local object 44. As fill-level indicator 48, a further value in the stack memory 32 shows the start of the free memory in the second memory region 36; that free memory is shown by hatching in FIG. 1.

Figure 2:
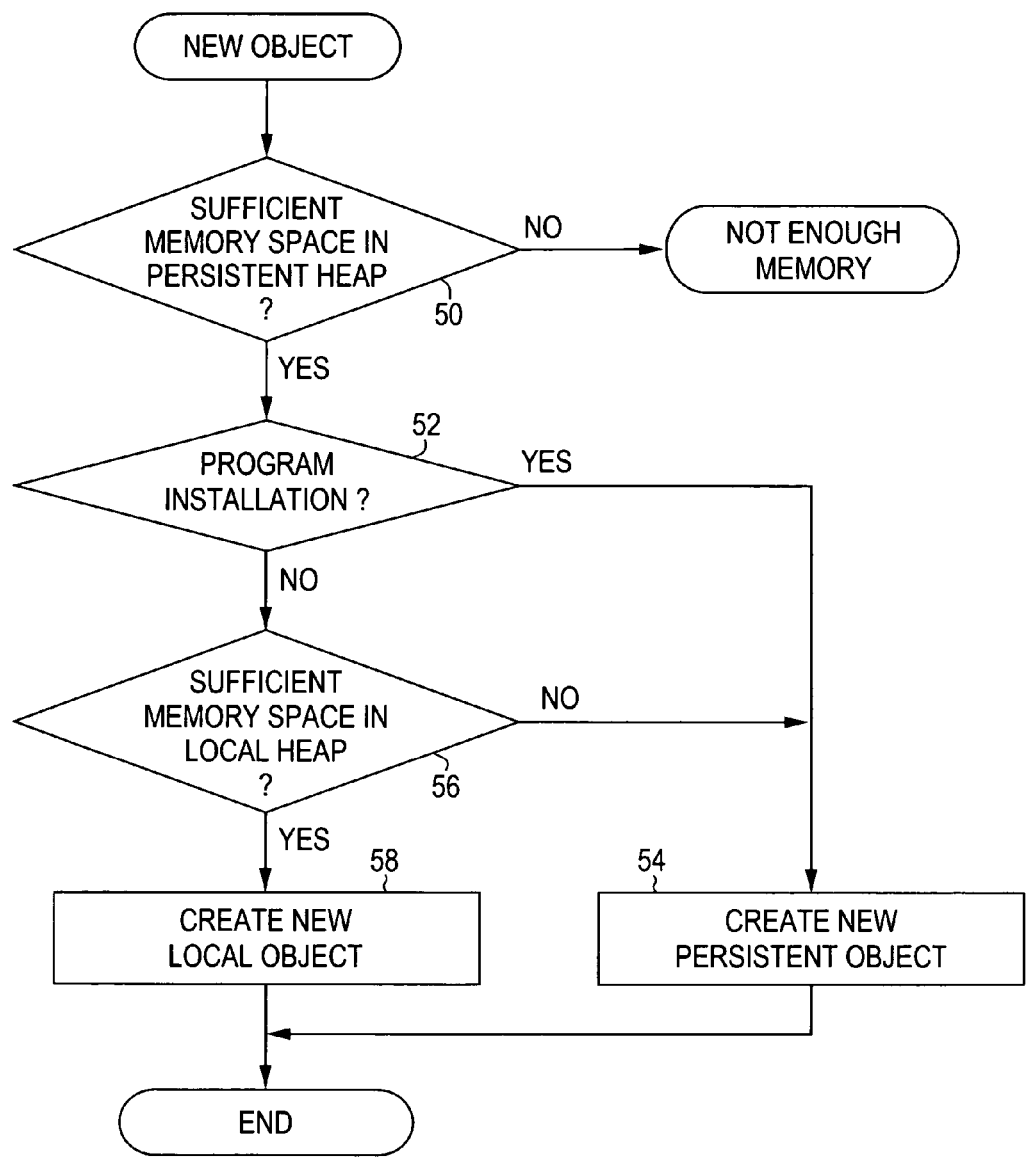
FIG. 2 is a flow diagram of a procedure performed on creation of a new object.

When, in execution of the program by the data carrier 10, the creation of a new object is requested by the command "NEW", the procedure shown in FIG. 2 is performed. Firstly, in step 50, it is checked whether sufficient memory space is free in the first memory region 34 for creation of the new object. If insufficient memory space is available, generation of the object is terminated with an error message. In the present exemplifying embodiment, the check in step 50 is carried out irrespective of the nature of the object to be created in order to ensure that even an object initially created in the second memory region 36 can, at any time, be transferred to the first memory region 34.

In the present exemplifying embodiment, provision is made so that objects which are created by the "install" installation method of the program 30 are always considered persistent objects and are therefore taken up into the first memory region 34. In step 52, therefore, it is queried whether program installation is currently being performed. If that is the case, the new object is generated, in step 54, as a persistent object in the first memory region 34. The generation procedure performed in step 54 corresponds to the creation of an object in the persistent heap performed in the case of a customary Java Card.

If it has been ascertained in step 52 that the program execution is outside the installation method, the new object to be created is, in the present exemplifying embodiment, regarded initially as a local object. It is then created in the second memory region 36—the local heap—provided that sufficient memory space is free therein, which is checked in step 56. If sufficient memory space is available in the local heap, the object is, in step 58, created therein at the next free location—immediately adjacent to the region used hitherto—and the fill-level indicator 48 is updated accordingly. If, however, the local heap is already too full, the customary procedure of object creation in the first memory region 34 is carried out in step 54, in which region of course, as checked in step 50, sufficient free memory space is still available.

During the further execution of the program 30 by the data carrier 10 it is checked, each time a persistent reference is generated or modified, whether the reference refers to an object located in the second memory region 36. If this is the case, the object is transferred from the second memory region 36 into the first memory region 34. Because of the query in step 50 it is ensured that this is possible at any time.

Figure 3:
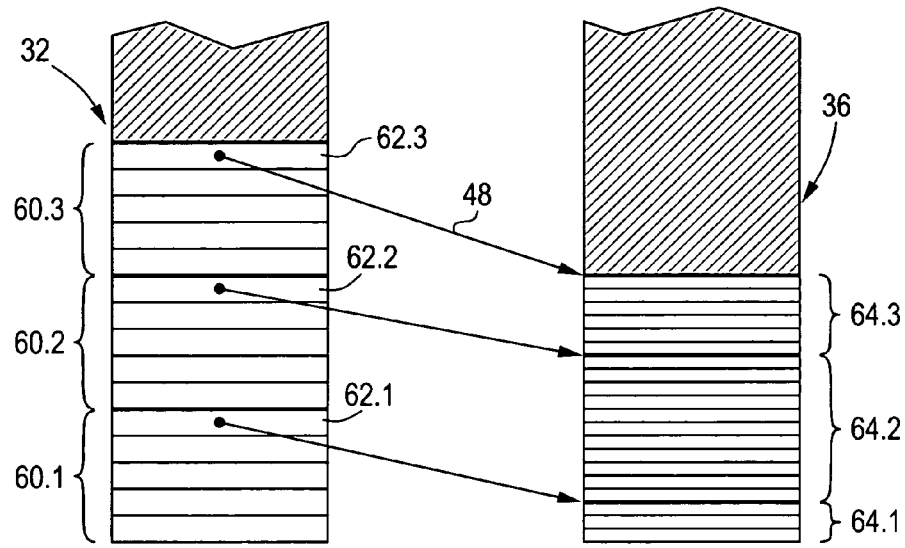
FIG. 3 illustrates, by way of example, memory occupation in a stack memory and a local heap during program execution.

In the present exemplifying embodiment, the second memory region 36 is organized similarly to a stack memory in order that, after termination of a method 30.x, the memory space occupied by the local objects generated in that method 30.x can be freed up in simple manner. To illustrate that procedure, FIG. 3 shows, by way of example, occupation of the stack memory 32 with several stack frames 60.1, 60.2, 60.3. In a manner known per se, when each method 30.x is called, a new stack frame 60.x is created, which is erased again on termination of the method 30.x. The stack frame 60.x contains a return address to the calling method, management and security data and also, optionally, local variables of the method called.

In the present exemplifying embodiment, each stack frame 60.x also has a fill-level field 62.x, which contains the fill-level indicator 48 during execution of the method 30.x in question. In the illustration of FIG. 3 given by way of example, the fill-level field 62.3 contains the current fill-level indicator 48, and the fill-level field 62.2 contains that fill level which was current when the method corresponding to the stack frame 60.3 was called. The portion 64.3 denotes that portion in the local heap which has been newly occupied by the method currently being executed, since it was called. The portions 64.1 and 64.2 in the local heap were filled by those methods the calling of which gave rise to creation of the memory frames 60.1 and 60.2, respectively.

In the exemplifying embodiment presently described, provision is made so that, on termination of a method, the space occupied by that method in the second memory region 36 is generally freed up completely. This occurs without further ado by means of the fact that, on termination of a method, the corresponding stack frame 60.x—including the fill-level field 62.x contained therein—is discarded and the fill-level field 62.(x−1) of the next oldest stack frame 60.(x−1) with its occupying contents stored therein is used as the new fill-level indicator 48. Accordingly, for example, after termination of that method the calling of which gave rise to creation of the stack frame 60.3, the contents of the fill-level field 62.2 are used as the new fill-level indicator 48 so that the entire memory portion 64.3 is freed up.

There is an exception to the rule given in the previous paragraph when the method just terminated returns to the calling method a reference to a local object that it has created in the second memory region 36. In that case, the contents of the current fill-level field 62.x are copied into the next oldest stack frame 60.(x−1) in order to prevent the local object from being overwritten. When, for example, in the memory occupation arrangement of FIG. 3, the method which has created the memory frame 60.3 returns a reference to an object located in the memory region 64.3, the value of the fill-level field 62.3 is copied into the fill-level field 62.2 of the preceding stack frame 60.2.

Figure 4:
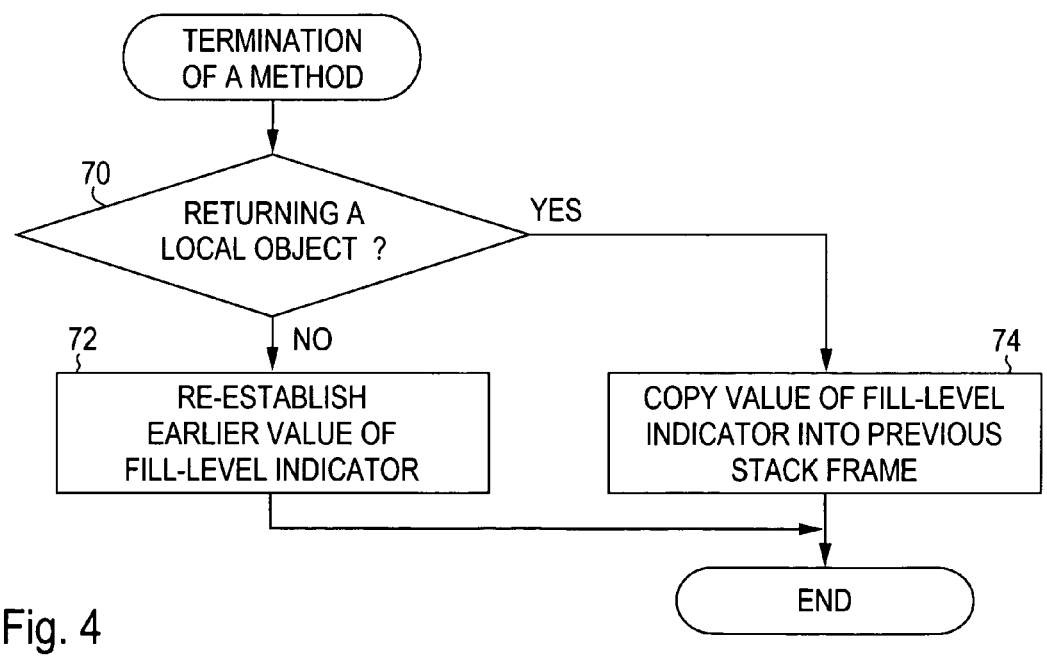
FIG. 4 is a flow diagram of a procedure performed on termination of a method.

The just described procedure on termination of a method is illustrated again in FIG. 4. Depending on the result of step 70, either the fill-level field 62.(x−1) of the preceding stack frame 60.(x−1) is reactivated (step 72) or the value of the current fill-level indicator 48 is carried over into the preceding stack frame 60.(x−1).

Figure 5:
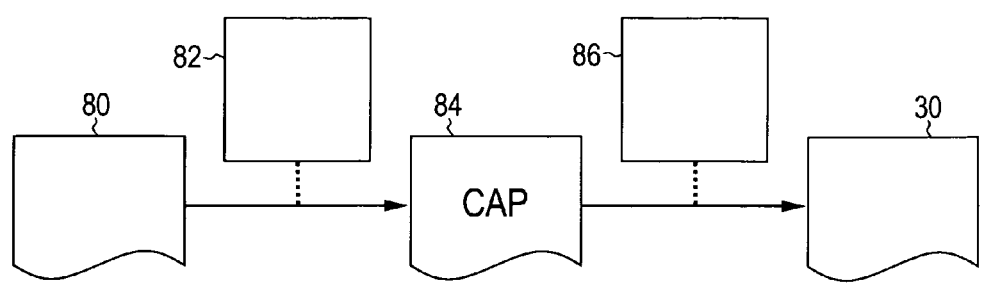
FIG. 5 is a diagrammatic representation of the conversion of a source program into an executable program.

FIG. 5 shows the translation procedure, known per se, of a Java source program 80 by a compiler 82 into a CAP file (Card Application File) 84. The CAP file 84 is in turn loaded, by a loading program 86—for example, on initialization of the data carrier 10—into the data carrier 10 as program 30. In the exemplifying embodiment described herein, the compiler 82 also has, in addition to the actual compiling module for translation of the source program 80 into byte code, a converter which carries out various correctness checks and which is also referred to as an "Off-Card Virtual Machine".

In the case of the process described hitherto, for the purpose of deciding whether an object to be newly created should be generated in the first or second memory region 34, 36, a simple query was performed at run time in step 52. Further run time checks were carried out on creation of and on updating of persistent references. In contrast, in alternative embodiments, provision is made so that the said checks are brought forward, in whole or in part, to the level of the compiler 82.

By means of abstract analysis of the source program 80 or of an intermediate code, the compiler 82 can obtain information as to whether an object to be newly created during later program execution is to be regarded as a local or non-local object. Depending on the result of that analysis, the compiler 82 then generates program code which brings about creation of the object either in the first memory region 34 or in the second memory region 36. In alternative embodiments, objects which have with certainty been recognized as local at compile time, such as local variables, are created in the stack memory 32. Depending on whether a local heap is additionally provided in the write/read memory 20, the stack memory 32 in those embodiments forms the entire second memory region 36 or part of the second memory region 36.

The source program 80 will usually be provided with commands for the generation of objects which at compile time cannot be unambiguously classified as local or non-local objects. Such objects either can be created immediately in the first memory region 34 or, in the manner described hereinbefore, can be initially created as local objects in the second memory region 36 and only transferred to the first memory region 34 when so required.

The particulars contained in the above description of sample embodiments should not be construed as limitations of the scope of the invention, but rather as exemplifications of preferred embodiments thereof. Accordingly, the scope of the invention should be determined not by the embodiments illustrated, but by the appended claims and their legal equivalents.

The invention claimed is:

1. A process for memory management in the execution of a program by a portable data carrier which has a first and a second memory region for storage of objects generated in program execution, wherein write operations to the second memory region are performed faster than write operations to the first memory region, and wherein the second memory region is organized as a heap memory with an occupied portion and a free portion, and wherein a fill level indicator indicates a boundary between the occupied portion and the free portion of the second memory region, the process comprising:
    creating an object at least in part in the second memory region, wherein the object is created during execution of a certain method of the program, wherein the certain method is distinct from a "select" method and distinct from a "deselect" method, which are called when changing between a plurality of programs of the portable data carrier, and wherein the program comprises the certain method and the "select" and "deselect" methods;
    monitoring, during further program execution, as to whether a persistently stored reference to the object is generated;
    transferring the object to the first memory region if, in the course of further program execution, said monitoring determines that a persistently stored reference to the object is generated; and
    on termination of said certain method, during execution of which the object was created, executing operations comprising:
        checking whether or not the certain method returns a reference to an object located in a certain portion of the second memory region, wherein the certain portion has been newly occupied by the certain method since the certain method was called; and if said checking indicates that the certain method does not return a reference to an object located in the certain portion of the second memory region, then resetting the fill-level indicator, which indicates the occupation of the second memory region, to the level current when the certain method was called, thus freeing up any memory space in the second memory region up to the level current when the certain method was called.

2. The process according to claim 1, wherein, on creation of an object in the second memory region, it is checked whether sufficient space is available in the first memory region for a transfer of the object which may become necessary.

3. The process according to claim 1, wherein objects which are generated during installation of the program are created in the first memory region.

4. The process according to claim 1, wherein only objects which have been identified as local objects on generation of the program from a source program are initially created in the second memory region.

5. The process according to claim 1 wherein the object created in the second memory region is a local and only temporarily required object.

6. The process according to claim 1, wherein the data carrier is a Java Card; and the program is a Java Card Applet.

7. The process according to claim 1, wherein the object is an exception object that is generated when an exception occurs.

8. The process according to claim 1, wherein the object is an object that is required only temporarily for a cryptographic operation.

9. The process according to claim 1, wherein the second memory region comprises a stack memory.

10. The process according to claim 1, wherein the first memory region is located in an EEPROM or another non-volatile writable memory of the portable data carrier.

11. The process according to claim 1, wherein the second memory region is located in a RAM of the portable data carrier.

12. The process according to claim 1, wherein the certain method is a "process" method for processing incoming data packets.

13. The process according to claim 1, wherein said freeing up of memory space in the second memory region by said resetting of said fill level indicator is distinct from garbage collection.

14. The process according to claim 1, wherein said monitoring as to whether a persistently stored reference to the object is generated is performed each time a persistently stored reference is generated or modified.

15. The process according to claim 1, wherein, if said checking indicates that the certain method does return a reference to an object located in the certain portion of the second memory region, the current value of the fill-level indicator is taken over for further use after termination of the certain method.

16. A portable data carrier having a processor for executing a program and a first and a second memory region for storage of objects generated in program execution, wherein write operations to the second memory region are performed faster than write operations to the first memory region, and wherein the second memory region is organized as a heap memory with an occupied portion and a free portion, and wherein a fill level indicator indicates a boundary between the occupied portion and the free portion of the second memory region, and wherein the memory contains instructions which cause the processor to carry out a process for memory management in the execution of the program, comprising:

creating an object at least in part in the second memory region, wherein the object is created during execution of a certain method of the program, wherein the certain method is distinct from a "select" method and distinct from a "deselect" method, which are called when changing between a plurality of programs of the portable data carrier, and wherein the program comprises the certain method and the "select" and "deselect" methods;

monitoring, during further program execution, as to whether a persistently stored reference to the object is generated;

transferring the object to the first memory region if, in the course of further program execution, said monitoring determines that a persistently stored reference to the object is generated; and on termination of said certain method, during execution of which the object was created, executing operations comprising:

checking whether or not the certain method returns a reference to an object located in a certain portion of the second memory region, wherein the certain portion has been newly occupied by the certain method since the certain method was called; and if said checking indicates that the certain method does not return a reference to an object located in the certain portion of the second memory region, then resetting the fill-level indicator, which indicates the occupation of the second memory region, to the level current when the certain method was called, thus freeing up any memory space in the second memory region up to the level current when the certain method was called.

17. The portable data carrier according to claim 16, wherein, on creation of an object in the second memory region, it is checked whether sufficient space is available in the first memory region for a transfer of the object which may become necessary.

18. The portable data carrier according to claim 16, wherein objects which are generated during installation of the program are created in the first memory region.

19. The portable data carrier according to claim 16, wherein only objects which have been identified as local objects on generation of the program from a source program are initially created in the second memory region.

20. The portable data carrier according to claim 16, wherein the data carrier is one of a chip card and a chip module.

21. The portable data carrier according to claim 16, wherein the object created in the second memory region is a local and only temporarily required object.

22. The portable data carrier according to claim 16, wherein the data carrier is a Java Card, and the program is a Java Card Applet.

23. The portable data carrier according to claim 16, wherein the object is an exception object that is generated when an exception occurs.

24. The portable data carrier according to claim 16, wherein the object is an object that is required only temporarily for a cryptographic operation.

25. The portable data carrier according to claim 16, wherein the second memory region comprises a stack memory.

26. The portable data carrier according to claim 16, wherein the first memory region is located in an EEPROM or another non-volatile writable memory of the portable data carrier.

27. The portable data carrier according to claim 16, wherein the second memory region is located in a RAM of the portable data carrier.

28. The portable data carrier according to claim 16, wherein the certain method is a "process" method for processing incoming data packets.

29. The portable data carrier according to claim 16, wherein said freeing up of memory space in the second memory region by said resetting of said fill level indicator is distinct from garbage collection.

30. The portable data carrier according to claim 16, wherein said instructions cause the processor to carry out said monitoring as to whether a persistently stored reference to the object is generated each time a persistently stored reference is generated or modified.

31. The portable data carrier according to claim 16, wherein, if said checking indicates that the certain method does return a reference to an object located in the certain portion of the second memory region, the current value of the fill-level indicator is taken over for further use after termination of the certain method.

* * * * *